Feb. 11, 1936.    L. H. GILLICK ET AL    2,030,580
VAPOR REGULATOR
Filed Nov. 19, 1934    3 Sheets-Sheet 1

Inventors.
Lawrence H. Gillick
and Edward A. Russell
By
Attorneys.

Patented Feb. 11, 1936

2,030,580

UNITED STATES PATENT OFFICE 2,030,580

VAPOR REGULATOR

Lawrence H. Gillick, Evanston, and Edward A. Russell, Chicago, Ill., assignors to Vapor Car Heating Company, Inc., Chicago, Ill., a corporation of New York Application November 19, 1934, Serial No. 753,662

11 Claims. (Cl. 236—40)

This invention relates to certain new and useful improvements in a vapor regulator adapted to control the flow of heating medium through a steam heating system, particularly a system utilizing steam or vapor at substantially atmospheric pressure, as in railway car heating systems of well known type.

Vapor regulators of this type usually comprise a valve for controlling the flow of steam from the source of supply to the heating system, together with thermostatic means for automatically closing the valve when uncondensed steam is returned from the heating system. In the usual vapor regulator of this type, the thermostatic device must be of sufficient power to close the valve against steam pressure, and since the steam pressure in the source of supply may vary, the thermostatic element must be capable of developing sufficient effort to overcome the maximum steam pressures which may be developed. According to the present invention the valve is controlled by a plurality of balanced springs so that the valve will automatically close when the required volume of steam is admitted to the heating system. A pressure-operated device cooperates with the spring mechanism to control the valve so that a predetermined pressure (usually atmospheric pressure) will not be exceeded in the heating system. The thermostatic element, when expanded by the return of steam from the heating system, will oppose the action of the balancing springs so as to permit the opening of the valve. The spring-pressure that must be overcome by the thermostatic element never exceeds a predetermined maximum, and variations in pressure in the source of steam supply have no effect on the operation of the thermostatic device. Therefore the thermostatic element may be of a standard size for all steam pressures, and need not be as powerful as has been required in former types of vapor regulators.

The principal object of this invention is to provide an improved vapor regulator of the type briefly described hereinabove and disclosed more in detail in the specifications which follow.

Another object is to provide a vapor regulator including a pressure reducing means for preventing the pressure in the heating system from exceeding a predetermined maximum.

Another object is to provide a vapor regulator including pressure reducing means for maintaining a desired predetermined steam pressure in the heating system.

Another object is to provide a vapor regulator including balanced mechanism for predetermining the pressure that must be exerted by the thermostatically operated device responding to the temperature of the returned fluids.

Another object is to provide a vapor regulator including an improved type of thermostatically operated mechanism responding to the temperature of the returned fluids.

Other objects and advantages of this invention will be more apparent from the following detailed description of one approved type of vapor regulator constructed and operating according to the principles of this invention.

Figure 1:
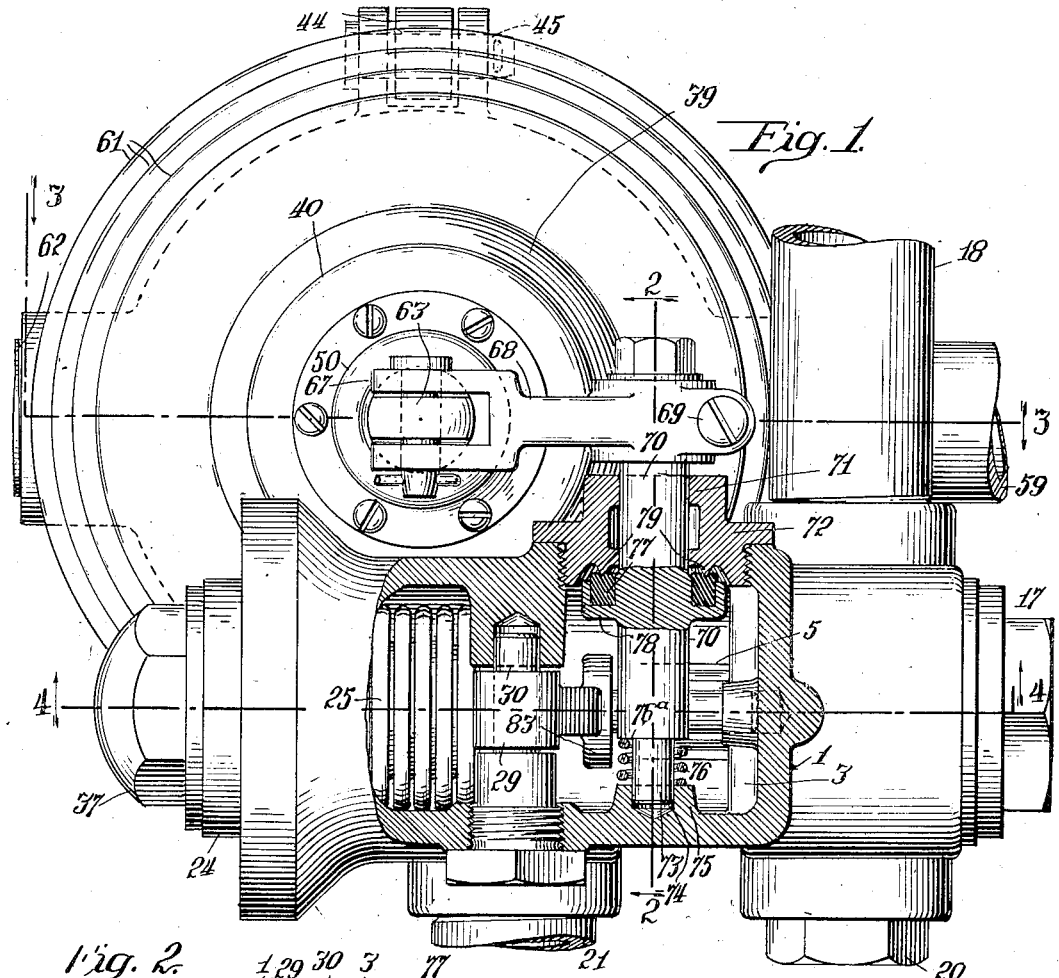
Fig. 1 is a plan view of the improved vapor regulator, partially broken away.
Figure 2:
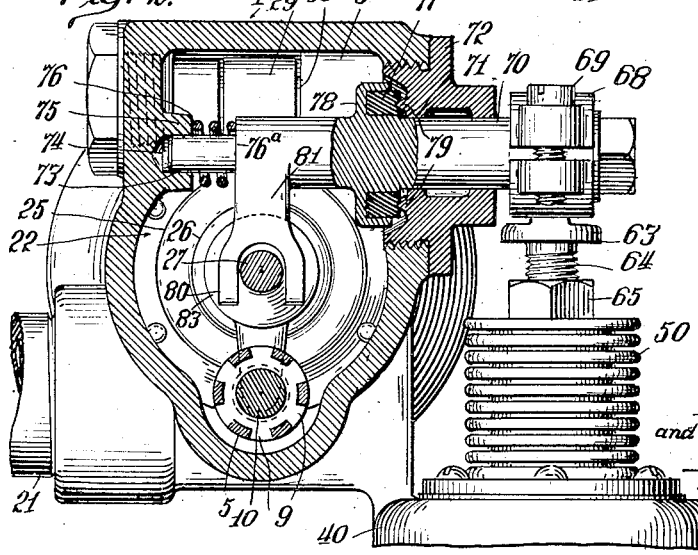
Fig. 2 is a partial vertical section, taken substantially on the line 2—2 of Fig. 1.

The vapor regulator comprises a main casing 1 which encloses a relatively high pressure steam-supply chamber 2 and a relatively low pressure chamber 3 from which steam or vapor is supplied to the heating system. The chambers 2 and 3 are separated by a web 4 in which a cage 5 is screwed at 6. A steam port 7 is formed through the cage 5, which is also provided with two series of lateral openings 8 and 9 so that steam can flow from supply chamber 2 through openings 8, 7 and 9 into the low pressure chamber 3. A valve stem 10 is slidable through a bearing 11 in one end of the cage structure, and through a similar bearing 12 in a closure member 13 screwed into the other end of the cage structure. Stem 10 carries a valve member 14 adapted to close against a valve seat 15 so as to cut off the flow of steam through port 7, the valve being urged to closed position by a spring 16 confined between the outer face of valve 14 and the inner face of closure member 13. A removable screw-plug 17 permits the insertion of this valve assembly within the casing 1. Since a relatively higher pressure exists in chamber 2 than in chamber 3, this pressure differential also acts on valve 14 to hold it in closed position. It will thus be seen that this valve is normally self-closing so as to cut off the flow of steam from chamber 2 into chamber 3 unless the valve is opened by the mechanisms hereinafter described.

A supply pipe 18 threaded into an opening 19 in one side of chamber 2 leads from the source of steam supply, such as the train-line or main steam supply pipe on a railway train. An alternative inlet opening in the opposite side of chamber 2 is closed by a plug 20. A delivery pipe 21 is threaded into an outlet opening in chamber 3 and leads to the radiating system or other device that is to be supplied with low pressure steam.

An annular assembly 22, clamped in position against a gasket 23 by a plug member 24 screwed in one wall of casing 1, carries one end of a flexible bellows diaphragm 25 secured at its other end to a collar 26 on a stem 27 which is slidable at its opposite end in an opening 28 formed in the opposite wall of casing 1. Stem 27 projects through an opening in a lever 29 pivoted at 30 within chamber 3, this lever having on one face a rounded projection 31 bearing against collar 26, and having on the opposite face of its lower end portion a rounded projection 32 bearing against the adjacent end of valve stem 10. One end portion of an expansion spring 33 bears against the other face of collar 26 and is centered by the end 34 of stem 27, the other end of this spring bearing against a centering block 35 having a concaved outer side which bears against the pointed end of an adjusting screw 36 threaded in the closure plug 24. A cap member 37 threaded into plug 24 normally encloses the outwardly projecting end of adjusting screw 36. Air under atmospheric pressure is admitted to the interior of bellows diaphragm 25 in any convenient manner, for example by the passage 38 in plug 24. It will be noted that the exterior of this diaphragm is always subject to the steam or vapor pressure existing in chamber 3.

It will be noted that atmospheric pressure plus the pressure of spring 33 is exerted on one side of collar 26, whereas the pressure existing in chamber 3 is exerted in the opposite direction. Assuming that atmospheric pressure is to be maintained in chamber 3, adjusting screw 36 will be so positioned that whenever the pressure in chamber 3 falls below atmospheric, the preponderance of pressure on the outer side of collar 26 will be sufficient to swing the lever 29 and open the valve 14 against the pressure of spring 16 and the steam pressure exerted on its outer face. However, whenever the pressure in chamber 3 rises to atmospheric, the pressure of spring 33 will be so overbalanced that spring 16 will again be able to close the valve 14. In this manner, just enough steam will be admitted to chamber 3 to maintain the pressure in this chamber, and the heating devices supplied therefrom, at atmospheric pressure. This desired pressure in chamber 3 will be maintained regardless of fluctuations in pressure in the supply chamber 2, it only being necessary that some higher pressure be maintained in this source of steam supply.

A hollow bell-casing 39 is suspended from a collar 40 extending from one side of casing 1. This bell encloses a return chamber 41 which is closed at its lower end by the cover 42 held against gasket 43 by the clamping screws 44 pivoted on the bell at 45 and extending through forked projections 46 on the cover member. The cover is clamped tightly in place by the nuts 47 on the lower ends of screws 44.

An operating stem 48 extends downwardly through an opening 49 in the top of collar 40 into the upper portion of return chamber 41. The top of the return chamber is closed by the flexible sealing bellows 50 secured at its lower end to the top of collar 40 and at its upper end to the top of stem 48. A closed thermostatic disk 51, filled with a suitable temperature-responsive fluid, is confined between a projection 52 on the lower side of head 53 at the lower end of stem 48, and a similar projection 54 on the upper surface of cover 42. The disk is also confined in properly centered position by a plurality of guide pins 55 projecting upwardly from the closure member 42. An expansion spring 56 is confined between a shoulder 57 in the upper portion of bell-casing 39 and a collar 58 on the head 53 of stem 48 so as to normally hold the stem down in engagement with the thermostatic disk.

Fluids from the heating system or other device that is being supplied with steam from chamber 3 will flow back through pipe 59, threaded at 60 into the bell 39, into the return chamber 41. These fluids will include condensate and non-condensable gases, and will also include steam in case an excess of steam is being supplied to the heating system. When there is no steam in the returned fluids, the temperature in chamber 41 will be such that the thermostatic disk 51 will collapse to its minimum thickness, and spring 56 will force stem 48 downwardly. Whenever steam flows into chamber 41 through pipe 59, thermostatic disk 51 will be heated so as to expand and lift the stem 48 against the pressure of spring 56. When this flow of steam into return chamber 41 ceases, the steam therein will be quickly condensed, the dissipation of heat from this chamber being assisted by the radiating ribs 61 formed on the outer surface of bell 39. The temperature in the return chamber will then fall so that thermostatic disk 51 will collapse and permit spring 56 to again move stem 48 downwardly. The condensate and other fluids are drained out from the return chamber 41 through pipe 62.

A block 63 carried by stem 64 threaded into the upper end of operating stem 48 and held in place by lock-nut 65 is pivoted at 66 in the forked outer end 67 of a crank arm 68 secured by clamping means 69 to the outer end portion of a shaft 70 which projects through bearing 71 in a closure plug 72 into the low pressure chamber 3. The opposite reduced end portion 73 of shaft 70 is guided in an opening 74 in the boss 75 projecting inwardly from the opposite wall of casing 1. A spring 76 confined between boss 75 and a shoulder 76ᵃ on shaft 70 serves to force a sealing ring 77 carried by shoulder 78 on the shaft into engagement with an annular projection 79 on the closure plug 72. This prevents the escape of steam from chamber 3 about the rotary shaft 70. The forked lower end 80 of an arm 81 extending downwardly from shaft 70 straddles the stem 27 and is provided with rounded projections 82 adapted to bear against projections 83 at one side of lever 29.

Figure 3:
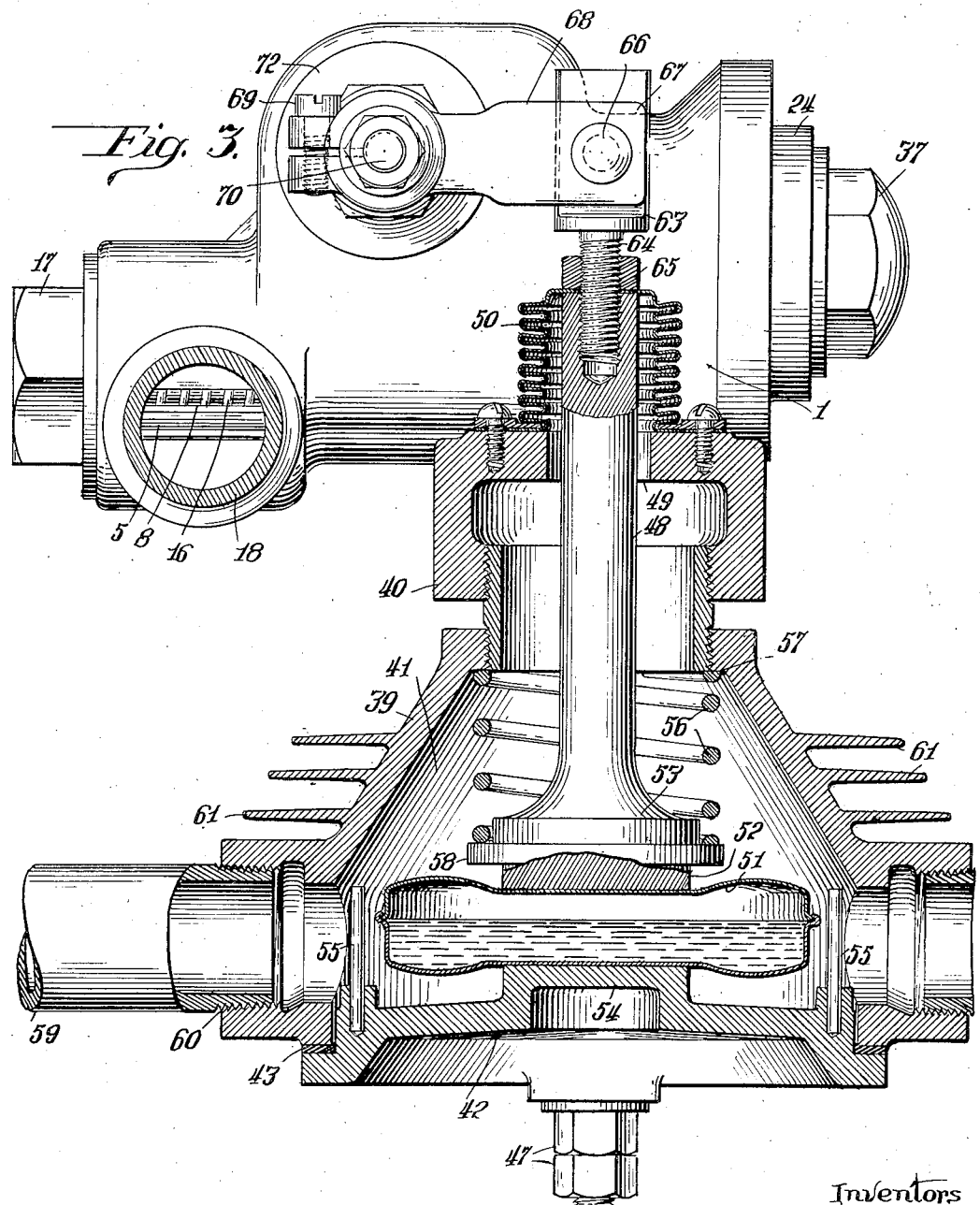
Fig. 3 is a vertical section taken substantially on the line 3—3 of Fig. 1.
Figure 4:
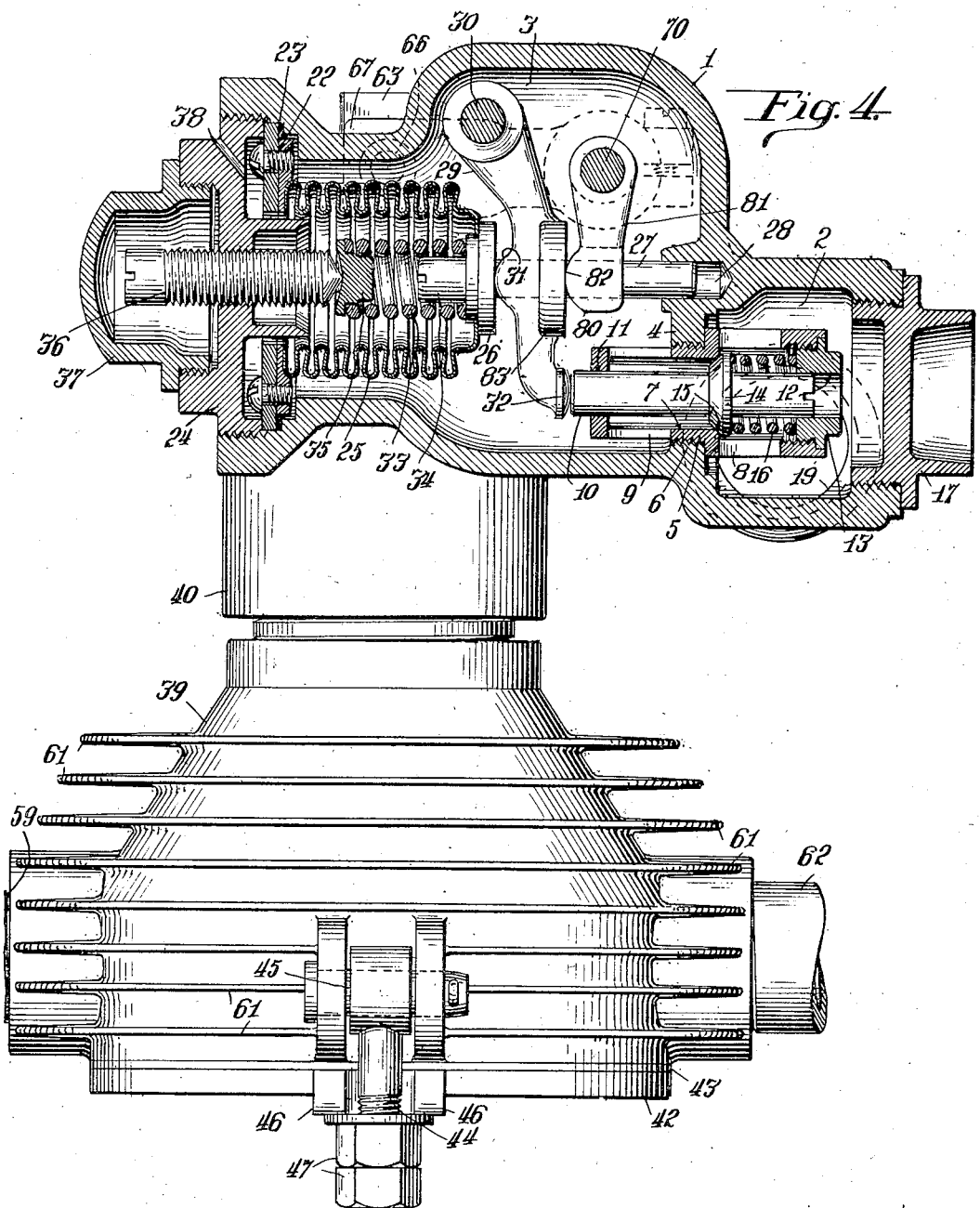
Fig. 4 is a vertical section taken substantially on the line 4—4 of Fig. 1.

It will now be apparent that when the thermostatic element 51 is heated and expands it will elevate the stem 48, thus swinging the crank arm 68 and shaft 70 in a counter-clockwise direction (Fig. 3), and swinging the crank arm 81 in a clockwise direction (Fig. 4), thus swinging lever 29 in such a direction as to compress the spring 33 and permit spring 16 to close the valve 14. When there is no steam present in return chamber 41 and the thermostatic disk 51 contracts, the spring 56 will function to lower the stem 48 with the result that crank arm 81 will be swung in the opposite or counter-clockwise direction (Fig. 4), so as to permit the spring 33 to open the valve in the event that the pressure in chamber 3 has fallen so that more steam is required. However, in the event that the steam pressure in chamber 3 is sufficiently high, this steam pressure will so oppose the action of spring 33 as to prevent the opening of the valve even though the crank arm 81 is swung out of engagement with the lever 29.

The spring 33 will be so adjusted that when the system is cold the force of this spring will be sufficient to overcome the force of spring 16 and open the valve 14 thus admitting steam through chamber 3. This steam has to displace the air in the heating system and, as long as the valve is open, will be increased by further steam admitted from the supply chamber 2, all of which tends to increase the pressure within chamber 3. On the other hand, this steam will be rapidly condensed since the system is cold, thus creating a partial vacuum and lowering the pressure. If the pressure in chamber 3 rises materially above atmospheric pressure, this increased pressure will over-balance the spring 33 so as to permit the valve to close. As soon as the condensation of steam lowers this pressure, spring 33 will again function to open the valve and admit more steam. In this manner the heating system will be supplied with steam, without at any time rising materially above atmospheric pressure, until the parts have been raised to such a temperature that the rate of condensation will decrease. Thereafter, just enough steam will be admitted through port 7 to replace the steam that is being condensed without permitting the pressure to rise materially above atmospheric. As soon as more steam is being supplied than is condensed in the radiating system, this excess steam will flow back through pipe 59 into the return chamber 41 and cause the thermostatic disk 51 to expand. This will operate the crank arm 81, as already described, to overbalance the pressure of spring 33 and permit valve 14 to close, regardless of the pressure then existing in chamber 3. It will thus be apparent that valve 14 will automatically close whenever the pressure in chamber 3 and the heating system supplied therefrom rises above a predetermined maximum, and whenever excess steam flows through the heating system and is returned to chamber 41.

It will be noted that the thermostatically operated device does not operate directly on the valve, but merely opposes the valve operating spring 33, so that there is a predetermined maximum pressure to be overcome by the thermostatic disk regardless of the steam pressure that may exist in the chamber 2 and source of steam supply. Therefore an excess of pressure in the steam supply will have no effect on the proper functioning of the thermostatic mechanism, and the disk 51 may be less powerful than has been heretofore required and may be more delicately adjusted. A single valve 14 functions both to control the steam pressure in the heating system, and also to cut off the further flow of steam to the system in case an excess of steam is being supplied.

We claim:

1. In a vapor regulator, a casing enclosing a high pressure steam chamber, a low pressure chamber from which steam is supplied to a heating device, a port connecting said chambers, and a return chamber into which is returned the steam supplied to the heating device, or fluids derived therefrom or both, a thermostatic element in the return chamber, a self-closing valve for normally closing said port, pressure-operated means for opening the valve when the pressure within the low pressure chamber falls below a predetermined minimum, and means operated by the thermostatic element for rendering the pressure-operated means ineffective whenever a predetermined temperature is exceeded in the return chamber.

2. In a vapor regulator, a casing enclosing a high pressure steam chamber, a low pressure chamber from which steam is supplied to a heating device, a port connecting said chambers, and a return chamber into which is returned the steam supplied to the heating device, or fluids derived therefrom or both, a thermostatic element in the return chamber, a valve for closing the port, pressure-reducing means controlling the positioning of the valve to maintain a predetermined pressure within the low pressure chamber, and means controlled by the thermostatic element for closing the valve whenever a predetermined temperature is exceeded in the return chamber.

3. In a vapor regulator, a casing enclosing a high pressure steam chamber, a low pressure chamber from which steam is supplied to a heating device, a port connecting said chambers, and a return chamber into which is returned the steam supplied to the heating device, or fluids derived therefrom or both, a thermostatic element in the return chamber, a self-closing valve for normally closing said port, and means controlled by the thermostatic element for opening the valve when the temperature in the return chamber falls below a predetermined temperature.

4. In a vapor regulator, a casing enclosing a high pressure steam chamber, a low pressure chamber from which steam is supplied to a heating device, a port connecting said chambers, and a return chamber into which is returned the steam supplied to the heating device, or fluids derived therefrom or both, a thermostatic element in the return chamber, a self-closing valve for normally closing said port, spring-actuated means for opening the valve, and means actuated by the thermostatic element for opposing the spring means to permit the valve to close when a predetermined temperature is exceeded in the return chamber.

5. In a vapor regulator, a casing enclosing a high pressure steam chamber, a low pressure chamber from which steam is supplied to a heating device, a port connecting said chambers, and a return chamber into which is returned the steam supplied to the heating device, or fluids derived therefrom or both, a thermostatic element in the return chamber, a self-closing valve for normally closing said port, spring-actuated means for opening the valve, means actuated either by the thermostatic element when a predetermined temperature is exceeded in the return chamber or by the pressure within the low pressure chamber when this pressure exceeded a predetermined maximum for opposing the spring to permit the valve to close.

6. In a vapor regulator, a casing enclosing a high pressure steam chamber, a low pressure chamber from which steam is supplied to a heating device, a port connecting said chambers, and a return chamber into which is returned the steam supplied to the heating device, or fluids derived therefrom or both, a thermostatic element in the return chamber, a self-closing valve for normally closing said port, spring-actuated means for opening the valve, means actuated by the thermostatic element for opposing the spring means to permit the valve to close when a predetermined temperature is exceeded in the return chamber and pressure-actuated means opposing the spring to permit the valve to close whenever the pressure within the low pressure chamber rises above a predetermined maximum.

7. In a vapor regulator, a casing enclosing a high pressure steam chamber, a low pressure chamber from which steam is supplied to a heating device, a port connecting these chambers, and a return chamber into which is returned the steam supplied to the heating device, or fluids derived therefrom or both, a thermostatic element in the return chamber, a valve for closing the port, means controlled by the thermostatic element for closing the valve whenever a predetermined temperature is exceeded in the return chamber, and pressure-operated means for determining the pressure of the steam in the low pressure chamber.

8. In a vapor regulator, a casing enclosing a high pressure steam chamber, a low pressure chamber from which steam is supplied to a heating device, a port connecting these chambers, and a return chamber into which is returned the steam supplied to the heating device, or fluids derived therefrom or both, a thermostatic element in the return chamber, a valve for closing the port, means controlled by the thermostatic element for closing the valve whenever a predetermined temperature is exceeded in the return chamber, and pressure-operated means for controlling the valve to determine the pressure of the steam in the low pressure chamber.

9. In a vapor regulator, a casing enclosing a high pressure steam chamber, a low pressure chamber from which steam is supplied to a heating device, a port connecting these chambers, and a return chamber into which is returned the steam supplied to the heating device, or fluids derived therefrom or both, a thermostatic element in the return chamber, a valve for closing the port, a spring normally acting to close the valve, spring-means opposing the first mentioned spring to open the valve, and means actuated by the expansion of the thermostatic element when subjected to a predetermined maximum temperature to overcome the last mentioned spring means and permit the valve to close.

10. In a vapor regulator, a casing enclosing a high pressure steam chamber, a low pressure chamber, a port connecting these chambers, and a return chamber into which fluids are returned from a heating device supplied from the low pressure chamber, a thermostatic element in the return chamber, a valve for closing the port, a spring normally acting to close the valve, spring-means opposing the first mentioned spring to open the valve, means actuated by the expansion of the thermostatic element when subjected to a predetermined maximum temperature to overcome the last mentioned spring means and permit the valve to close and pressure-operated means effective when a predetermined pressure is exceeded in the low pressure chamber for also overcoming the last-mentioned spring means to permit the valve to close.

11. In a vapor regulator, a casing enclosing a high pressure steam chamber, a low pressure chamber, a port connecting these chambers, and a return chamber into which fluids are returned from a heating device supplied from the low pressure chamber, a thermostatic element in the return chamber, a valve for closing the port, a spring normally acting to close the valve, movable means for opening the valve in opposition to the closing spring, an adjustable spring device adapted to actuate the movable means to open the valve, a pressure operated diaphragm subject on one side to atmospheric pressure and on the other side to the pressure within the low pressure chamber, said pressure-operated diaphragm also acting on the movable means and opposing the action of the spring-device to permit the valve to close when a predetermined pressure is reached in the low-pressure chamber, and means actuated by the expansion of the thermostatic element when subjected to a predetermined maximum temperature to move the movable means to permit the valve to close regardless of the pressure existing in the low-pressure chamber.

LAWRENCE H. GILLICK.
EDWARD A. RUSSELL.